(12) United States Patent
Schmidtke et al.

(10) Patent No.: US 10,574,391 B2
(45) Date of Patent: Feb. 25, 2020

(54) ADAPTABLE FORWARD ERROR CORRECTION

(71) Applicant: Facebook, Inc., Menlo Park, CA (US)

(72) Inventors: Hans-Juergen Schmidtke, Mountain View, CA (US); Ilya Lyubomirsky, Pleasanton, CA (US)

(73) Assignee: Facebook, Inc., Menlo Park, CA (US)

( * ) Notice: Subject to any disclaimer, the term of this patent is extended or adjusted under 35 U.S.C. 154(b) by 169 days.

(21) Appl. No.: 15/668,634

(22) Filed: Aug. 3, 2017

(65) Prior Publication Data
US 2019/0044654 A1 Feb. 7, 2019

(51) Int. Cl.
*H04L 1/00* (2006.01)
*H04B 10/079* (2013.01)
*H04L 1/20* (2006.01)
*H04B 10/516* (2013.01)

(52) U.S. Cl.
CPC ..... *H04L 1/0057* (2013.01); *H04B 10/07953* (2013.01); *H04B 10/516* (2013.01); *H04L 1/005* (2013.01); *H04L 1/0007* (2013.01); *H04L 1/0009* (2013.01); *H04L 1/203* (2013.01)

(58) Field of Classification Search
CPC ....... H04L 1/0057; H04L 1/203; H04L 1/004; H04B 10/07953; H03M 13/03; H03M 13/25; H03M 13/47; H03M 13/015; H03M 13/29; H03M 13/2906; H03M 13/2957
USPC ......................... 714/752, 755, 776
See application file for complete search history.

(56) References Cited

U.S. PATENT DOCUMENTS

| | | | | |
|---|---|---|---|---|
| 6,445,471 | B1* | 9/2002 | Shimokawa | H04B 10/25073 398/79 |
| 6,452,707 | B1* | 9/2002 | Puc | H04B 10/25073 398/158 |
| 6,889,347 | B1* | 5/2005 | Adams | H04B 10/07953 398/147 |
| 7,734,191 | B1* | 6/2010 | Welch | B82Y 20/00 398/158 |
| 2003/0099018 | A1* | 5/2003 | Singh | B82Y 20/00 398/82 |
| 2003/0101406 | A1* | 5/2003 | Song | H03M 13/00 714/774 |
| 2004/0047020 | A1* | 3/2004 | Islam | H04B 10/2935 359/233 |
| 2004/0179837 | A1* | 9/2004 | Bock | H04B 10/07951 398/25 |
| 2010/0080562 | A1* | 4/2010 | Perkins | H04J 14/0227 398/98 |
| 2011/0004799 | A1* | 1/2011 | Shimanuki | H04L 1/0003 714/749 |
| 2011/0320905 | A1* | 12/2011 | Lin | H04L 1/0067 714/752 |

(Continued)

FOREIGN PATENT DOCUMENTS

JP 2010034830 A * 2/2010

*Primary Examiner* — Albert Decady
*Assistant Examiner* — Osman M Alshack
(74) *Attorney, Agent, or Firm* — Van Pelt, Yi & James LLP

(57) ABSTRACT

Optical fiber data communications are described. An error correction circuit can receive a signal and correct bit errors of that signal. The circuit can then determine characteristics of the signal (e.g., its bit error rate (BER)) and adjust the operations performed to correct the bit errors of the signal based on the characteristics.

20 Claims, 4 Drawing Sheets

(56) References Cited

U.S. PATENT DOCUMENTS

| | | | | |
|---|---|---|---|---|
| 2012/0246537 A1* | 9/2012 | Kubo | ............... | H04L 1/0057 714/752 |
| 2013/0156420 A1* | 6/2013 | Amitai | ............ | H04B 10/07953 398/27 |
| 2013/0209092 A1* | 8/2013 | Sato | ............... | H04B 10/2507 398/27 |
| 2016/0233979 A1* | 8/2016 | Koike-Akino | ..... | H03M 13/1111 |

* cited by examiner

ADAPTABLE FORWARD ERROR CORRECTION

TECHNICAL FIELD

This disclosure relates to an adaptable forward error correction (FEC) in an optical fiber data communications system.

BACKGROUND

Optical fiber data communications systems can include components assembled upon a board to implement sophisticated functionalities. For example, on-board optics and application-specific integrated circuits (ASICs) can be arranged on a board of an optical fiber data communications system. However, the arrangement of the components might result in physical layout constraints for the optical fiber interconnects and electrical interconnects between the various components. This can result in the lengths of the interconnects to be different. For example, one optical sub-assembly might be a different distance from the pins of an ASIC than another optical sub-assembly. Different distances can result in different characteristics of signals of the channels implemented by the interconnects and components and, therefore, the different signals can have different bit error rates (BERs).

Forward error correction (FEC) is a technique that can be used to identify and fix bit errors of signals. However, some channels might not need as much FEC processing or functionality than other channels due to the signals having different BERs.

DETAILED DESCRIPTION

Some of the material described in this disclosure include systems and techniques for adapting forward error correction (FEC) for different channels of an optical fiber data communications system. In one example, an application-specific integrated circuit (ASIC) can receive signals via electrical channels to be processed via FEC circuitry to reduce bit errors from the transmission of the signals over unreliable or noisy interconnect. The characteristics (e.g., bit error rates (BERs)) of the different signals of the channels can be determined. Based on those characteristics, the operational parameters of the FECs for different channels can be determined. This can result in different FECs on the same ASIC processing their respective signals differently based on the signals having different characteristics. For example, one FEC might be set to perform more iterative decoding operations than another FEC due to having a higher BER, resulting in the FEC performing more iterative decoding operations to be "stronger" than the other FEC. Thus, the FECs can be adapted based on the characteristics of the signals that they receive. This can allow for a more tailored approach to implementing FECs and, therefore, lower power requirements because FECs processing signals with a lower BER can have reduced functionality.

Figure 1:
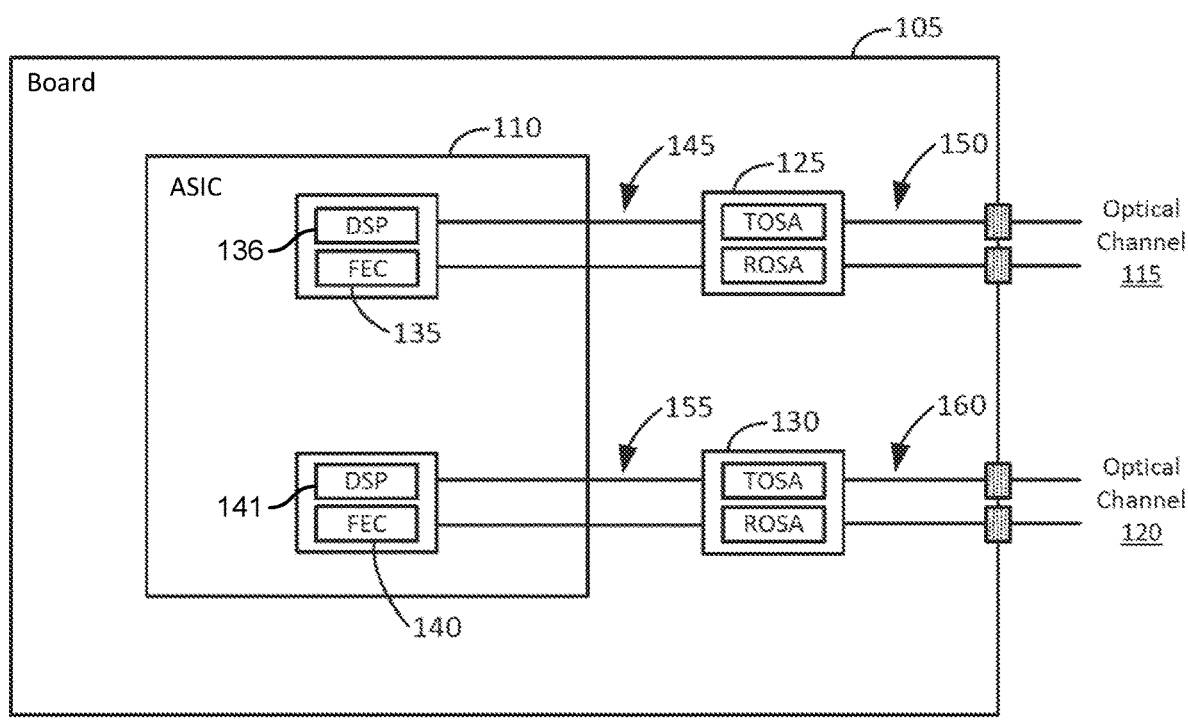
FIG. 1 illustrates an example of an optical fiber data communications system implementing adaptable forward error correction (FEC).

In more detail, FIG. 1 illustrates an example of an optical fiber data communications system implementing adaptable forward error correction (FEC). In FIG. 1, board 105 can be an electro-optical printed circuit board with electrical interconnects 145 and 155 providing different electrical channels based on optical signals received from optical channels 115 and 120, respectively. For example, optical channel 115 can provide pulses of light as an optical signal to optical fiber 150. The optical signal can be received by the receiver of an optical sub-assembly 125 (ROSA in FIG. 1) to convert the optical signal into an electrical signal that is transmitted via electrical interconnect 145 (e.g., copper) and to ASIC 110. The transceiver of the optical sub-assembly 125 (TOSA in FIG. 1) can be used to convert an electrical signal received from ASIC 110 into an optical signal for transmission via optical channel 115. Likewise, optical channel 120 can provide light (at a different wavelength than the light of optical channel 115) upon optical fiber 160 and to the receiver of optical sub-assembly 130 to convert the optical signal into an electrical signal that is transmitted via electrical interconnect 155 to ASIC 110.

The different components and interconnects that compose the channels can have different characteristics, for example, different lengths, widths, paths on board 105, etc. Some of the similar or same components might also have process variations resulting in slight differences among the channels. These different characteristics can result in different performances or quality levels of those channels. For example, optical sub-assembly 125 having a transmitter (TOSA in FIG. 1) and receiver (ROSA in FIG. 1) might be a different distance from the pins of ASIC 110 than optical sub-assembly 130. Thus, the lengths of electrical interconnect 145 and electrical interconnect 155 might be different. Additionally, the lengths of optical fibers 150 and 160 might be different. This can result in different characteristics and, therefore, the signals can be affected differently. For example, if electrical interconnect 145 is slightly longer than electrical interconnect 155, then the quality of the channel corresponding to electrical interconnect 145 might be worse than the quality of the channel corresponding to electrical interconnect 155 (e.g., experience more noise). Thus, when the signals from electrical interconnect 145 and electrical interconnect 155 are received by FEC 135 and FEC 140, respectively, they may have different bit error rates (BERs). That is, some of the bits of the signals might be altered due to interference, noise, etc. (e.g., observed as a "1" instead of a "0") more so on the signal received by FEC 135 than the signal received by FEC 140.

As depicted in FIG. 1, digital signal processing (DSP) can also be performed (e.g., by DSP circuitry 136 and 141 in FIG. 1) upon the signals received from electrical interconnects 145 and 155. For example, filtering, noise reduction, etc. can be performed along with the FEC techniques disclosed herein.

Implementing FEC 135 and FEC 140 similarly can result in an increase in power consumption (e.g., an increase in the electrical energy consumed over time to perform the operations or functionality) by ASIC 110 and, therefore, the optical fiber data communications system. For example, some FEC techniques might decode bits using a similar block size (e.g., the number of bits analyzed at a time to determine whether there is an error) during many decoding iterations of the error correction (e.g., repetitive functionality performed to determine whether there is an error based on the block size). If FEC 135 and 140 are similar, then the same block size and number of decoding iterations can be performed. However, due to the differences in the characteristics of the signals received via the channels (e.g., due to the placement of the components and interconnects as previously discussed), the BERs of the signals can be different. Thus, designing FEC 135 and FEC 140 based on the performance or quality of the worst-performing channel (e.g., worst BER) results in the better-performing channel providing a signal to a FEC that would provide some unnecessary processing.

For example, FEC 135 might perform more decoding iterations with a larger block size to correct the BER of signals that it receives to a sufficient level (e.g., to a threshold BER). By contrast, FEC 140 might be able to correct the BER of signals that it receives to the sufficient level using a different sized block size (e.g., smaller) and with fewer decoding iterations than FEC 135. By using a different block size and fewer decoding iterations, the amount of power utilized by FEC 140 can be lower than FEC 135. Additionally, the latency of FEC 140 (e.g., how long it takes to perform the forward error correction) can also be faster (e.g., less time) than the latency of FEC 135.

Thus, in FIG. 1, characteristics of the signal received via electrical interconnect 145 can be analyzed. Based on those characteristics, operational parameters of FEC 135 can be determined and, therefore, the performance (e.g., functionality or operations) of FEC 135 can be adjusted based on the operational parameters. For example, the BER of the signal received via electrical interconnect 145 can be determined and the number of decoding iterations to be performed by FEC 135 to reduce the BER to a threshold level or rate can be determined. The performance of FEC 135 can then be adjusted accordingly to provide the number of decoding iterations. By contrast, the signal received via electrical interconnect 155 can also be received by FEC 140 and the BER can be determined to be lower than the BER of the signal received by FEC 135 from electrical interconnect 145. As a result, FEC 140 can be set to perform a fewer number of decoding iterations than FEC 135, resulting in FEC 140 having lower power requirements than FEC 135.

Though many of the examples described herein include determining the BER of a signal before it is processed by an FEC, other characteristics of signals can include signal-to-noise ratio (SNR) (e.g., the level of a signal to the level of background noise). Other operational parameters can also include the coding gain of the FEC. For example, a higher BER can result in the corresponding FEC to be set to a higher coding gain (e.g., a an indication or measure in the difference between the SNR levels between the uncoded system and coded system to reach a similar BER when used with the FEC). Thus, functionality providing a higher coding gain can be provided for FECs receiving signals with higher BERs.

The forward error correction described herein can be any of a variety of error correcting techniques including Reed-Solomon error correction.

Figure 2:
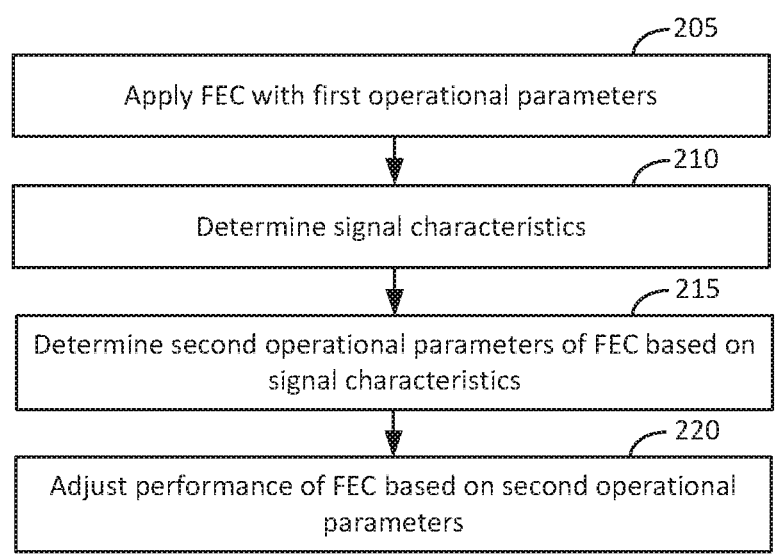
FIG. 2 illustrates an example of a block diagram for adapting FEC.
Figure 3A:
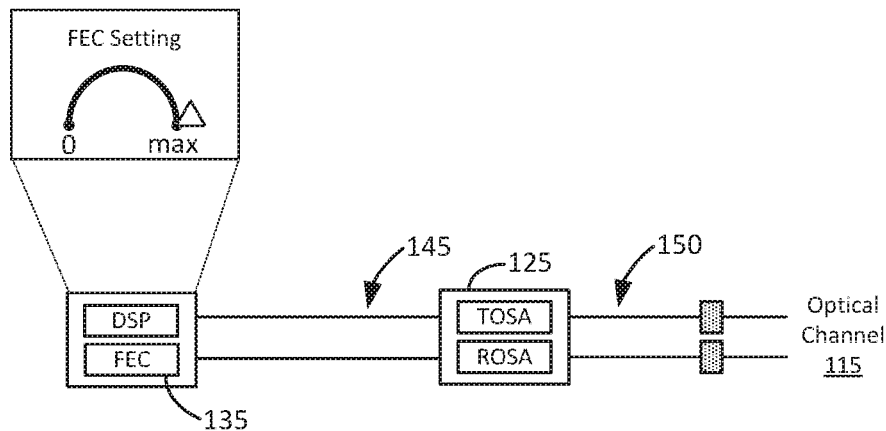
FIGS. 3A and 3B illustrate another example of an optical fiber data communications system implementing adaptable FEC.
Figure 3B:
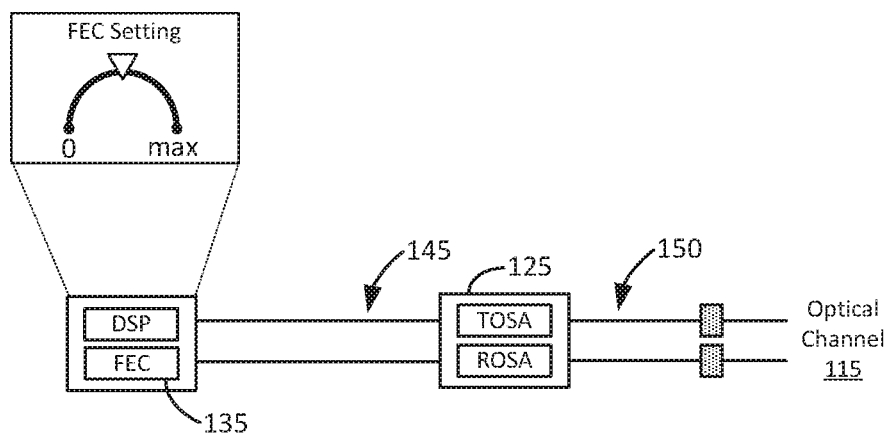

FIG. 2 illustrates an example of a block diagram for adapting FEC. FIGS. 3A and 3B illustrate another example of an optical fiber data communications system implementing adaptable FEC. In FIG. 2, FEC can be applied to a signal using first operational parameters (205). For example, in FIG. 3A, FEC 135 can initially be operating in accordance with operational parameters that might result in functionalities or operations having relatively high power consumption. For example, many decoding iterations may be performed, larger block sizes may be used for the decoding iterations, and/or the coding gain may be relatively high.

As signals are received by FEC 135 in FIG. 3A, the characteristics of the signal can be determined (210). For example, the BER, SNR, or other characteristics representative of the quality or performance of the signal provided via optical channel 115, optical fiber 150, optical subassembly 125, and electrical interconnect 145 can be determined.

Based on the characteristics, second operational parameters of the FEC can be determined (215). For example, if the BER of the signal associated with optical channel 115 in FIG. 3A is determined, then how FEC 135 performs (e.g., the functionality it provides) can be adjusted based on the determined BER. In one example, the functionality provided by FEC 135 can be adjusted such that it has lower power requirements due to changing its operational parameters, for example, by reducing the number of decoding iterations performed, changing the block size, reducing the coding gain, etc. The operational parameters can be changed such that the BER is within a threshold or acceptable level. In some implementations, the functionality can be reduced such that the power requirements are reduced while maintaining a BER of 0% (i.e., FEC 135 is able to correct the number of errors such that none remain).

In FIGS. 3A and 3B, this is portrayed as "FEC Setting" being reduced from a maximum to a lower level. As previously discussed, this can represent reduced functionality that also results in lower power requirement, for example, reducing the number of decoding iterations, reducing block sizes, etc. Thus, in the example of FIGS. 3A and 3B, the FEC can operate or function at a relatively high level (e.g., a maximum number of decoding iterations) and then adjust downwards based on the BER (e.g., a lower number of decoding iterations).

Once the second operational parameters are determined, the performance of the FEC can be adjusted (220). For example, the FEC can be set to reduce its number of decoding iterations to the number as indicated in the second operational parameters that were determined based on the BER of the signal. As previously discussed, different FEC circuits on the same device (e.g., ASIC 110 in FIG. 1) can be implemented such that they can have different operational parameters and, therefore, perform differently.

Later, if the characteristics of the signal changes such as bit errors reappear or if the BER increases, FEC 135 in FIB. 3B can be further adjusted. For example, new operational parameters can be determined such that the functionality of FEC 135 is changed again. For example, if the BER increases, then FEC 135 can be adjusted to increase the number of decoding iterations, change the block sizes, change the coding gain, etc. Thus, if environmental changes occur (e.g., change in temperature), FEC 135 can be adjusted to account for those changes.

Figure 4:
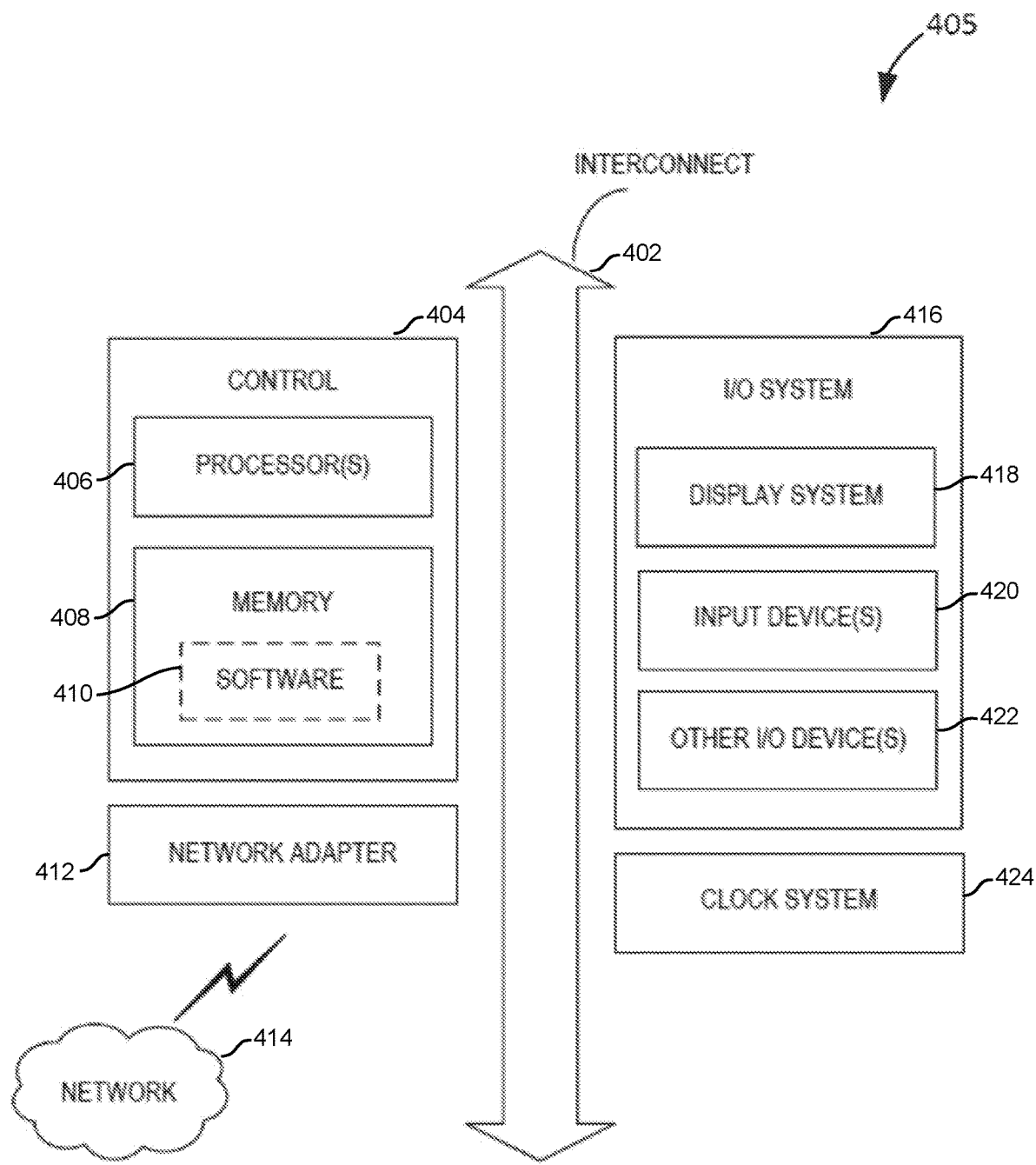
FIG. 4 illustrates an example of a system implementing an adaptable FEC.

Embodiments of the subject matter and the operations described in this specification can be implemented in analog and/or digital electronic circuitry, or in computer software, firmware, or hardware, including the structures disclosed in this specification and their structural equivalents, or in combinations of one or more of them. For example, FIG. 4 illustrates an example of a system 405 implementing an adaptable FEC. System 405 includes interconnect 402, control 404, network adapter 412 configured to communicate with network 414, I/O system 416, and clock system 424. Control 404 includes processor(s) 406 and memory 408 configured to store software 410. I/O system 416 includes display system 418, input device(s) 420 and other I/O device(s) 422. Embodiments of the subject matter described in this specification can be implemented as one or more computer programs, i.e., one or more modules of computer program instructions, encoded on computer storage medium for execution by, or to control the operation of, data processing apparatus.

A non-transitory computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium also can be, or can be included in, one or more separate physical components or media (e.g., multiple CDs, disks, or other storage devices). The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. An optical fiber data communications system, comprising:
   a first forward error correction (FEC) circuit configured to:
   receive a first signal,
   determine first characteristics representative of a quality of the first signal, and
   change first operational parameters including by changing a first number of decoding iterations of the first FEC circuit to represent a first adjusted power consumption and a first desired performance level of the first FEC circuit based on the determined first characteristics representative of the quality of the first signal, wherein the first FEC circuit is configured to change the first operational parameters including by being configured to select a first block size representing a first number of bits to be analyzed at a time to correct bit errors; and
   a second FEC circuit configured to:
   receive a second signal,
   determine second characteristics representative of a quality of the second signal, and
   change second operational parameters including by changing a second number of decoding iterations of the second FEC circuit to represent a second adjusted power consumption and a second desired performance level of the second FEC circuit based on the determined second characteristics representative of a quality of the second signal, wherein the second FEC circuit is configured to change the second operational parameters including by being configured to select a second block size representing a second number of bits to be analyzed at a time to correct bit errors, the first block size and the second block size being different sizes;

wherein the first characteristics and the second characteristics being different, and the first desired performance level and the second desired performance level being different; and wherein the first FEC circuit and the second FEC circuit are included on a same integrated circuit chip configured to independently control at least the different numbers of decoding iterations of the different FEC circuits on the same integrated circuit chip to optimize power consumption of at least one of the first FEC circuit or the second FEC circuit to have a lower power requirement.

2. The optical fiber data communications system of claim 1, wherein the first FEC circuit implements Reed-Solomon error correction, and the second FEC circuit also implements Reed-Solomon error correction.

3. The optical fiber data communications system of claim 1, wherein the first operational parameters includes the first number of decoding iterations to correct bit errors of the first signal, and the second operational parameters includes the second number of decoding iterations to correct bit errors of the second signal, the first number and the second number being different numbers.

4. The optical fiber data communications system of claim 1, wherein the first characteristics includes a bit error rate (BER) of the first signal, and the second characteristics includes a BER of the second signal.

5. The optical fiber data communications system of claim 4, wherein the BER of the first signal is different than the BER of the second signal, and the first operational parameters and the second operational parameters are different based on the BER of the first signal being different than the BER of the second signal.

6. The optical fiber data communications system of claim 4, wherein the BER of the first signal is higher than the BER of the second signal, and the first operational parameters are representative of the first FEC circuit performing more decoding iterations to correct bit errors than the second FEC circuit.

7. The optical fiber data communications system of claim 4, wherein the BER of the first signal is higher than the BER of the second signal, and the first operational parameters are representative of the first FEC circuit providing a higher coding gain than the second FEC circuit.

8. The optical fiber data communications system of claim 1, wherein the first characteristics includes a signal-to-noise ratio (SNR) of the first signal, and the second characteristics includes a SNR of the second signal.

9. The optical fiber data communications system of claim 8, wherein the SNR of the first signal is different than the SNR of the second signal.

10. A method, comprising:
receiving a first signal;
determining first characteristics representative of a quality of the first signal;
changing first operational parameters including by changing a first number of decoding iterations of a first forward error correction (FEC) circuit to represent a first adjusted power consumption and a first desired performance level of a first forward error correction based on the determined first characteristics representative of the quality of the first signal, wherein changing the first operational parameters includes selecting a first block size representing a first number of bits to be analyzed at a time to correct bit errors;
receiving a second signal;

determining second characteristics representative of a quality of the second signal; and changing second operational parameters including by changing a second number of decoding iterations of a second FEC circuit to represent a second adjusted power consumption and a second desired performance level of a second forward error correction based on the determined second characteristics representative of a quality of the second signal, wherein changing the second operational parameters includes selecting a second block size representing a second number of bits to be analyzed at a time to correct bit errors, the first block size and the second block size being different sizes;

wherein the first characteristics and the second characteristics being different, and the first desired performance level and the second desired performance level being different; and wherein the first FEC circuit and the second FEC circuit are included on a same integrated circuit chip configured to independently control at least the different numbers of decoding iterations of the different FEC circuits on the same integrated circuit chip to optimize power consumption of at least one of the first FEC circuit or the second FEC circuit to have a lower power requirement.

11. The method of claim 10, wherein the first forward error correction implements Reed-Solomon error correction, and the second forward error correction also implements Reed-Solomon error correction.

12. The method claim 10, wherein the first operational parameters includes the first number of decoding iterations to correct bit errors of the first signal, and the second operational parameters includes the second number of decoding iterations to correct bit errors of the second signal, the first number and the second number being different numbers.

13. The method of claim 10, wherein the first characteristics includes a bit error rate (BER) of the first signal, and the second characteristics includes a BER of the second signal.

14. The method of claim 13, wherein the BER of the first signal is different than the BER of the second signal, and the first operational parameters and the second operational parameters are different based on the BER of the first signal being different than the BER of the second signal.

15. The method of claim 13, wherein the BER of the first signal is higher than the BER of the second signal, and the first operational parameters are representative of the first forward error correction performing more decoding iterations to correct bit errors than the second forward error correction.

16. The method of claim 13, wherein the BER of the first signal is higher than the BER of the second signal, and the first operational parameters are representative of the first forward error correction providing a higher coding gain than the second forward error correction.

17. The method of claim 10, wherein the first characteristics includes a signal-to-noise ratio (SNR) of the first signal, and the second characteristics includes a SNR of the second signal.

18. A system, comprising:
a first forward error correction (FEC) circuit configured to:
receive a first signal,
determine first characteristics representative of a quality of the first signal, and determine first operational parameters including by determining a first number of decoding iterations of the first FEC circuit to represent a first power consumption and a first desired performance level of the first FEC circuit based on the determined first characteristics representative of the quality of the first signal, wherein the first FEC circuit is configured to determine the first operational parameters including by being configured to select a first block size representing a first number of bits to be analyzed at a time to correct bit errors; and a second FEC circuit configured to:

receive a second signal, determine second characteristics representative of a quality of the second signal, and determine second operational parameters including by determining a second number of decoding iterations of the second FEC circuit to represent a second power consumption and a second desired performance level of the second FEC circuit based on the determined second characteristics representative of a quality of the second signal, wherein the second FEC circuit is configured to determine the second operational parameters including by being configured to select a second block size representing a second number of bits to be analyzed at a time to correct bit errors, the first block size and the second block size being different sizes;

wherein the first characteristics and the second characteristics being different, and the first desired performance level and the second desired performance level being different; and wherein the first FEC circuit and the second FEC circuit are included on a same integrated circuit chip configured to independently control at least the different numbers of decoding iterations of the different FEC circuits on the same integrated circuit chip to optimize power consumption of at least one of the first FEC circuit or the second FEC circuit to have a lower power requirement.

19. The system of claim 18, wherein the first FEC circuit implements Reed-Solomon error correction, and the second FEC circuit also implements Reed-Solomon error correction.

20. The system of claim 18, wherein the first operational parameters includes the first number of decoding iterations to correct bit errors of the first signal, and the second operational parameters includes the second number of decoding iterations to correct bit errors of the second signal, the first number and the second number being different numbers.

* * * * *